US010996821B2

(12) United States Patent
Horiike

(10) Patent No.: US 10,996,821 B2
(45) Date of Patent: May 4, 2021

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Yoshiteru Horiike, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/503,310

(22) Filed: Jul. 3, 2019

(65) Prior Publication Data

US 2020/0019284 A1 Jan. 16, 2020

(30) Foreign Application Priority Data

Jul. 12, 2018 (JP) ............................ JP2018-132479

(51) Int. Cl.

| | |
|---|---|
| ***G06F 3/0482*** | (2013.01) |
| ***H04N 1/00*** | (2006.01) |
| ***G06F 3/0484*** | (2013.01) |
| ***G06F 3/0488*** | (2013.01) |

(52) U.S. Cl.

CPC .......... *G06F 3/0482* (2013.01); *G06F 3/0484* (2013.01); *G06F 3/04883* (2013.01); *H04N 1/00411* (2013.01)

(58) Field of Classification Search

CPC .. G06F 3/0482; G06F 3/04883; G06F 3/0484; G06F 3/0488; G06F 3/1201; G06F 3/048; H04N 1/00411

See application file for complete search history.

(56) References Cited

U.S. PATENT DOCUMENTS

| | | | | |
|---|---|---|---|---|
| 2014/0300559 | A1* | 10/2014 | Tanimoto | G06F 3/0484 345/173 |
| 2015/0042576 | A1* | 2/2015 | Wang | G06F 3/0488 345/173 |
| 2015/0145820 | A1* | 5/2015 | Huang | G06F 3/04883 345/174 |
| 2016/0006887 | A1* | 1/2016 | Takenaka | H04N 1/4433 358/1.13 |
| 2016/0011706 | A1* | 1/2016 | Horiike | H04N 1/00411 345/173 |
| 2016/0042496 | A1* | 2/2016 | Ichimi | G06T 3/40 345/671 |
| 2017/0289380 | A1* | 10/2017 | Oguchi | G06F 3/1219 |
| 2018/0091667 | A1* | 3/2018 | Yamasaki | H04N 1/00472 |
| 2018/0314474 | A1* | 11/2018 | Nakaya | G06F 3/1238 |

FOREIGN PATENT DOCUMENTS

| | | | |
|---|---|---|---|
| JP | 2016018510 | A | 2/2016 |
| JP | 6225959 | B2 | 11/2017 |

* cited by examiner

*Primary Examiner* — Jeanette J Parker

(74) *Attorney, Agent, or Firm* — Canon U.S.A., Inc. IP Division

(57) ABSTRACT

An image processing apparatus that, in a case where processing corresponding to a user operation is determined to be cancelled before cancellation of the processing corresponding to the user operation, the user operation is determined to correspond to a hold-down operation, and a context menu is displayed in a case where the user operation corresponds to the hold-down operation.

7 Claims, 13 Drawing Sheets

414 —
| CALL |
| --- |
| CHANGE NAME OF SHARED BUTTON |
| DELETE SHARED BUTTON |
| MOVE BUTTON |

415 —
| CALL |
| --- |
| CHANGE NAME OF MY BUTTON |
| DELETE MY BUTTON |
| MOVE BUTTON |

416 —
| MOVE BUTTON |
| --- |
| EDIT BUTTON |
| SETTING OF BUTTON SIZE AND NUMBER OF BUTTONS |
| SETTING OF BACKGROUND |
| SETTING OF HOME SCREEN MANAGEMENT |
| SETTING OF SHORTCUT BUTTONS FOR FUNCTIONS |

417 —
| CALL |
| --- |
| REGISTER ON HOME SCREEN |
| DELETE |

IMAGE PROCESSING APPARATUS, CONTROL METHOD FOR IMAGE PROCESSING APPARATUS, AND STORAGE MEDIUM

BACKGROUND

Field of the Disclosure

The present disclosure generally relates to image processing and, more particularly, to an image processing apparatus that detects a user operation on a touch display, a control method for the image processing apparatus, and a storage medium.

Description of the Related Art

In recent years, image processing apparatuses such as a multi-function peripheral (MFP) including a touch display have been generally used. A touch display has a configuration in which a display for providing display during user operation and a touch panel that detects a position where the user operation is performed are integrally formed.

An image processing apparatus includes applications for executing various functions (copy, scan, print, facsimile (FAX), etc.), and software keys respectively corresponding to the applications are displayed on a touch display. A user taps a software key, thereby making it possible to activate the application corresponding to the software key.

To prevent execution of erroneous processing due to an error operation on the touch display, a condition for executing the processing, as well as a condition for cancelling the execution of the processing can be set. Japanese Patent Application No. 2014-142729 discusses an image processing apparatus having a configuration in which a predetermined threshold is set for a distance from a touch-down position on a button area, and when the threshold is exceeded, processing corresponding to a touched-down button is not executed.

Not only a configuration in which processing corresponding to a software key is executed when a user selects the software key, but also a configuration in which a plurality of processings corresponding to a software key is displayed as a context menu to be selected is known. Japanese Patent No. 6225959 discusses an information processing apparatus that displays a context menu in a range selected by a mouse.

SUMMARY

According to one or more aspects of the present disclosure, an image processing apparatus includes a plurality of applications for using functions of the image processing apparatus, a software key for activating one of the plurality of applications being arranged on a touch display having a configuration in which a display and a touch panel provided in the image processing apparatus are integrally formed, the image processing apparatus including a detection unit configured to detect a user operation based on a pressure on the touch display, and a display unit configured to display a context menu for displaying a function corresponding to the software key on the touch display, wherein in a case where processing corresponding to the user operation is determined to be cancelled before cancellation of the processing corresponding to the user operation, the user operation is determined to correspond to a hold-down operation, and the context menu is displayed in a case where the user operation corresponds to the hold-down operation.

Further features of the present disclosure will become apparent from the following description of exemplary embodiments with reference to the attached drawings.

DESCRIPTION OF THE EMBODIMENTS

Figure 1:
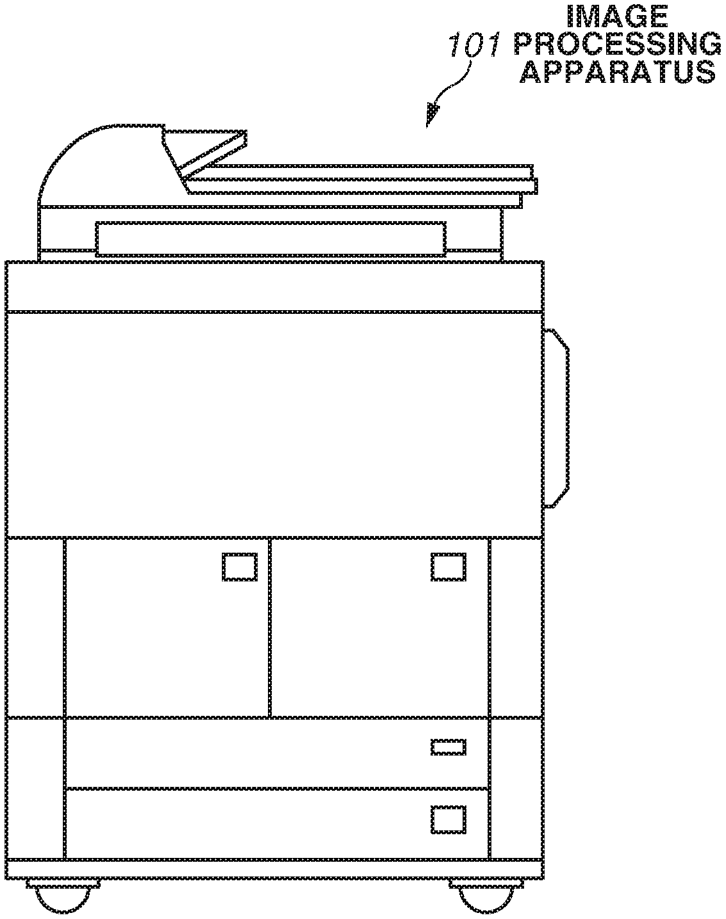
FIG. 1 illustrates a system configuration according to an exemplary embodiment of the present disclosure.

As discussed in Japanese Patent No. 6225959, it is possible to employ a configuration in which processing corresponding to a software key is executed by a tap operation on the software key and in which a context menu is displayed when the software key is selected by holding down the software key. In addition, if Japanese Patent Application No. 2014-142729 is taken into consideration in this configuration, it is also possible to employ a configuration in which a context menu is displayed if a movement distance of a touch position touched by a user falls within a certain distance, and the context menu is not displayed when the movement distance is greater than or equal to the certain distance.

However, in a case where a pressure sensitive touch display is used, the context menu cannot be displayed depending on a user operation method, even when the user wishes to display the context menu. In the case of using the pressure sensitive touch display, the entire area with which a user's finger pad is in contact is recognized as a touch position by the user. As a result, the width of the finger pad is regarded as the movement distance of the touch position.

If the movement distance satisfies the condition in which the context menu is not displayed, the context menu is not displayed even when the user holds down the software key.

The present disclosure is directed to re-executing determination as to whether a user operation satisfies a condition for displaying a context menu, without cancelling processing of displaying the context menu, even when the user operation on a software key displayed on a pressure sensitive touch display satisfies a condition for executing cancellation of the processing.

According to an exemplary embodiment of the present disclosure, it is possible to re-execute the determination as to whether the user operation satisfies the condition for displaying the context menu, without cancelling processing of displaying the context menu, even when the user operation on the software key displayed on the pressure sensitive touch display satisfies the condition for executing cancellation of processing.

Various exemplary embodiments, features, and aspects of the present disclosure will be described below with reference to the accompanying drawings. The following exemplary embodiments are merely examples, and therefore are not intended to limit the present disclosure.

<Definition of User Operation>

A first exemplary embodiment will be described below. A user operation according to the present exemplary embodiment will be described below.

Touch (or touch operation): A general touch operation to be performed by a finger on a touch display.

Release (or release operation): An operation in which a user's finger in a contact state is separated from the touch display.

Tap operation (or tap): An operation in which a user's finger is caused to contact the touch display and is then released from the touch display.

Hold-down operation (or hold-down): An operation in which the state where a user's finger is in contact with the touch display is maintained for a certain period of time. A period in which the user's finger is in contact with the touch display is longer than that in the tap operation.

Flick operation (or flick): An operation in which a user's finger is moved to flick in any direction on the touch display.

Drag operation (or drag): An operation in which a user's finger is caused to move from a state where a specific object is selected by a hold-down operation, without executing the release operation.

<System Configuration>

FIG. 1 illustrates a system configuration of an image processing apparatus 101 according to the present exemplary embodiment. Specific examples of the image processing apparatus 101 include a multi-function peripheral (MFP) having various functions such as copy, scan, print, and facsimile (FAX) functions.

<Hardware Configuration of Image Processing Apparatus>

Figure 2:
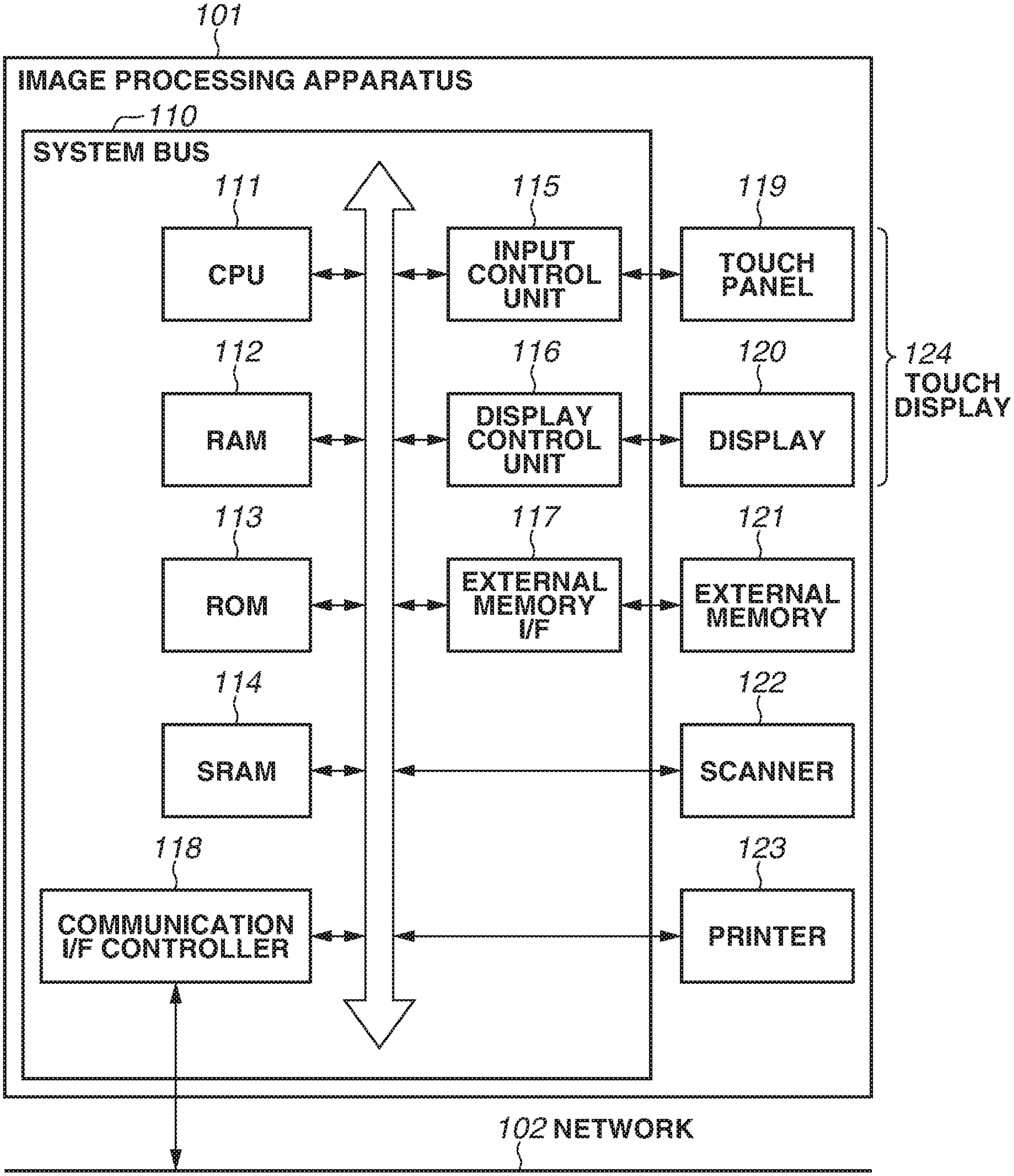
FIG. 2 is a block diagram illustrating a hardware configuration of an image processing apparatus according to the exemplary embodiment of the present disclosure.

FIG. 2 is a block diagram illustrating a hardware configuration of the image processing apparatus 101.

A central processing unit (CPU) 111, a random access memory (RAM) 112, a read-only memory (ROM) 113, a static RAM (SRAM) 114, an input control unit 115, a display control unit 116, an external memory interface (I/F) 117, and a communication I/F controller 118, which are included in the image processing apparatus 101, are connected via a system bus 110. A touch panel 119, a display 120, an external memory 121, a scanner 122, and a printer 123 are each connected to the system bus 110. Each processing unit included in the image processing apparatus 101 is configured to exchange data via the system bus 110.

The ROM 113 is a nonvolatile memory. Image data, data other than image data, various programs based on which the CPU 111 operates, and the like are respectively stored in predetermined areas of the ROM 113. The RAM 112 is a volatile memory and is used as a temporary storage area such as a main memory or a work area for the CPU 111.

The CPU 111, which may include one or more processors, one or more memories, circuitry, or a combination thereof, may control each unit of the image processing apparatus 100 by using the RAM 112 as a work memory based on, for example, programs stored in the ROM 113. The programs based on which the CPU 111 operates are not necessarily stored in the ROM 113, but instead may be preliminarily stored in the external memory 121 (such as a hard disk). The SRAM 114 is a nonvolatile recording medium capable of high-speed operation.

The input control unit 115 receives a user operation, generates a control signal, and supplies the control signal to the CPU 111. For example, the input control unit 115 receives a user operation from a keyboard (not illustrated), a mouse (not illustrated), or the touch panel 119, which function as an input device. The touch panel 119 is an input device configured to output coordinate information corresponding to a contact position on, for example, an input control unit that is two-dimensionally or three-dimensionally configured. The present exemplary embodiment will be described focusing on a case where the touch panel 119 and the display 120 are integrated to form a touch display 124. Further, according to the present exemplary embodiment, the touch display 124 is a pressure sensitive touch display that determines a user operation based on a pressure of a user's finger on the touch display 124.

<Pressure Sensitive Touch Display>

A method for detecting a user operation on the touch display 124 will be described with reference to FIGS. 8A and 8B.

Figure 8A:
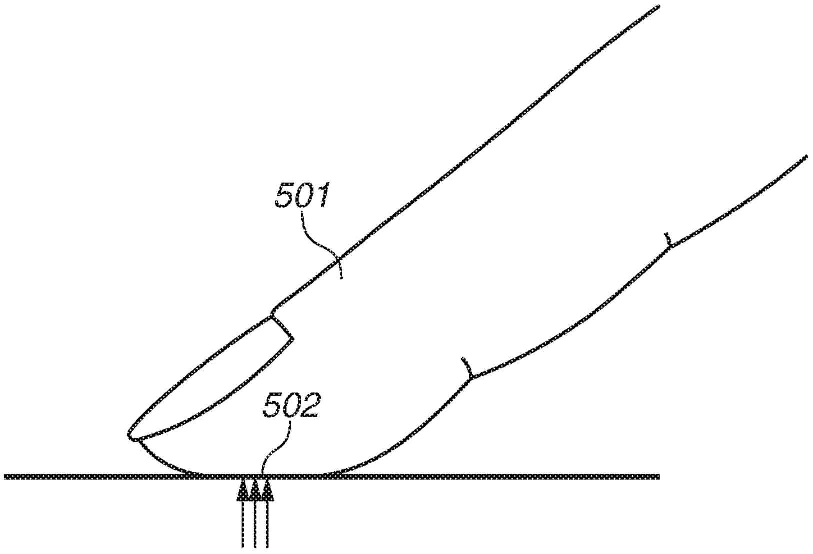
FIG. 8A illustrates an example of a variation at a touch position on an electrostatic touch display.

FIG. 8A illustrates a state where the hold-down operation is executed by a user's finger in a case where the touch display 124 is an electrostatic touch display. When the user intends to execute the hold-down operation, the pad of a finger 501 is pressed on the touch display 124 as illustrated in FIG. 8A. As a result, a variation of the finger 501 is detected as a coordinate variation 502.

Figure 8B:
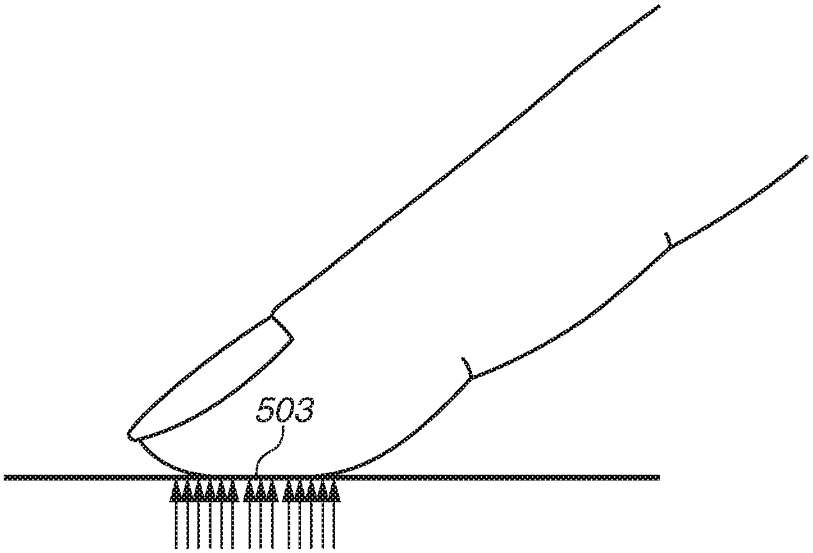
FIG. 8B illustrates an example of a variation at a touch position on a pressure sensitive touch display.

FIG. 8B illustrates a state where the hold-down operation is executed by a finger in a case where the touch display 124 is a pressure sensitive touch display. When the user intends to execute the hold-down operation by pressing the pad of the finger 501 on the touch display 124 as illustrated in FIG. 8B, the area of the pad of the finger 501 is regarded as coordinates where the hold-down operation is executed, and is detected as a coordinate variation. As a result, the coordinate variation 503 is greater than the coordinate variation 502. The coordinate variation in the pressure sensitive touch display is different from the coordinate variation in the electrostatic touch display. This is because in the former case, a user operation is detected based on a pressure applied when the touch display 124 is pressed, whereas in the latter case, a user operation is detected based on a current that flows through the surface of the touch display 124 and fluctuates when the touch display 124 is pressed.

Referring again to FIG. 2, the CPU 111 controls each processing unit of the image processing apparatus 101 in accordance with programs based on the control signal that is generated and supplied by the input control unit 115 in response to the user operation performed on the input device. Accordingly, the image processing apparatus 101 can perform an operation depending on the user operation.

The display control unit 116 outputs a display signal for causing the display 120 to display an image. For example, the CPU 111 supplies the display control unit 116 with a display control signal generated based on a program. The display control unit 116 generates a display signal based on the display control signal and outputs the generated display signal to the display 120. For example, the display control unit 116 causes the display 120 to display a graphical user interface (GUI) screen, which constitutes a GUI, based on the display control signal generated by the CPU 111.

In the present exemplary embodiment, the touch panel 119 is integrally formed with the display 120, and also functions as an operation unit. For example, a manufacturer produces the touch panel 119 in such a manner that the transmittance of light is set so as not to inhibit the display on the display 120, and the touch panel 119 is attached to an upper layer of a display surface of the display 120. Then, the manufacturer associates input coordinates on the touch panel 119 with display coordinates on the display 120. The GUI that enables the user to directly operate a screen displayed on the display 120 is thus configured. The touch panel 119 and the display 120 being integrated is referred to as the touch display 124.

The external memory 121, such as a hard disk, a floppy disk, a compact disc (CD), a digital versatile disc (DVD), or a memory card, can be mounted on the external memory I/F 117. Under the control of the CPU 111, the external memory I/F 117 reads out data from the mounted external memory 121, and writes data into the external memory 121. Under the control of the CPU 111, the communication I/F controller 118 communicates with various networks 102 such as a local area network (LAN), the Internet, and wired or wireless networks. Various apparatuses, such as a personal computer (PC), an MFP, a printer, and a server, are connected to the networks 102 so that the apparatuses can communicate with the image processing apparatus 101.

The scanner 122 scans a document and generates image data. The printer 123 executes print processing based on a user instruction input through the input control unit 115, or a command input from an external apparatus via the communication I/F controller 118. The CPU 111 functions as a specifying unit, and can specify, for example, a gesture operation and a state as described below.

As the touch panel 119, various types of touch panels may be used. Examples of various types of touch panels include a resistive touch panel, a capacitive touch panel, a surface acoustic wave touch panel, an infrared touch panel, an electromagnetic induction touch panel, an image recognition touch panel, and an optical sensor touch panel.

The image processing apparatus 101 can store image data in the RAM 112 or the external memory 121 by at least one of the storage methods. For example, the image processing apparatus 101 stores image data generated based on the document scanned by the scanner 122. Alternatively, the image processing apparatus 101 stores image data received from an external apparatus, such as a PC, which is connected to the networks 102 via the communication I/F controller 118. Yet alternatively, the image processing apparatus 101 stores image data received from a portable storage medium (such as a universal serial bus (USB) memory or a memory card) mounted on the external memory I/F 117. In addition, the image processing apparatus 101 may store image data in the external memory 121 by another storage method. The image data to be stored may be data in which various setting contents including a print setting content on the document scanned by the scanner 122 are reflected. The image data to be displayed on the display 120 may include character information or image information such as a photograph and a graphic image, or may include both character information and image information, or other information. Further, the image data may be sample images preliminarily stored.

<Software Configuration of Image Processing Apparatus>

Figure 3:
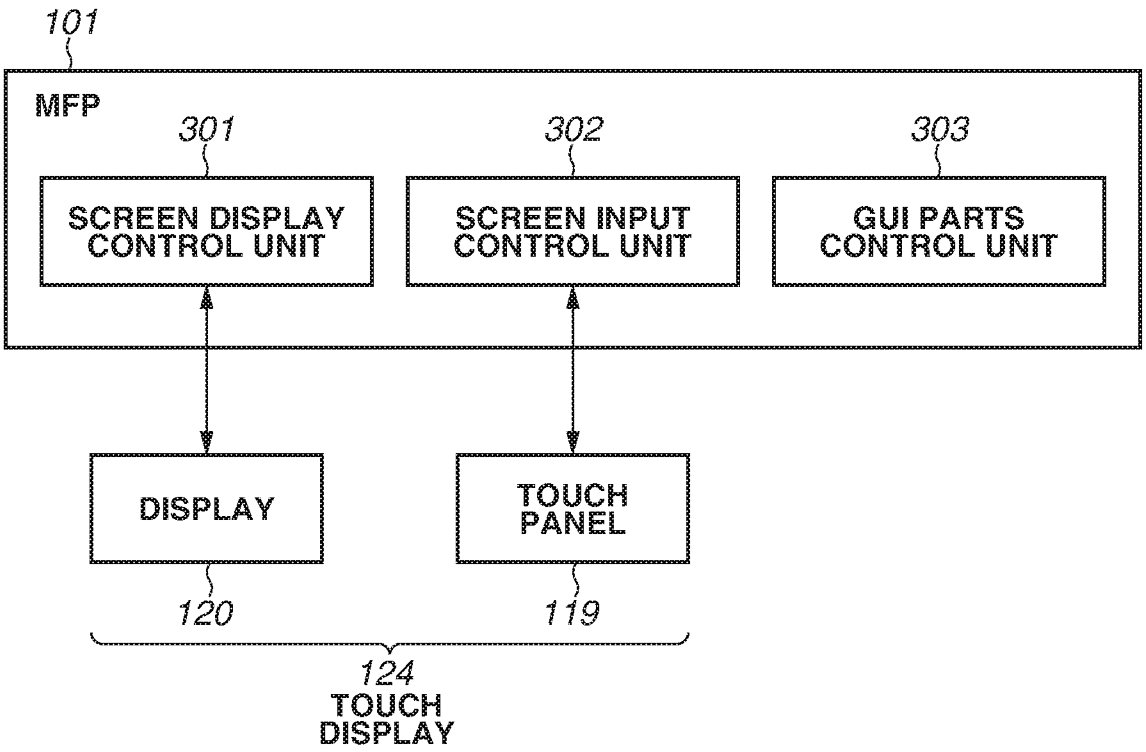
FIG. 3 is a block diagram illustrating a software configuration of the image processing apparatus according to the exemplary embodiment of the present disclosure.

FIG. 3 is a block diagram illustrating a software configuration of the image processing apparatus 101. According to the present exemplary embodiment, unless otherwise noted, information is exchanged between software modules illustrated in FIG. 3 in such a manner that the CPU 111 controls the RAM 112, the ROM 113, the input control unit 115, and the display control unit 116 via the system bus 110. The image processing apparatus 101 includes functions of a screen display control unit 301, a screen input control unit 302, and a GUI parts control unit 303.

The screen display control unit 301 mainly performs application management processing, processing for transferring information about a screen to the display 120, and processing for sending a notification about an event input from the touch panel 119 to an application.

The screen input control unit 302 receives and analyzes a signal that is converted from a user operation on the touch panel 119 by the input control unit 115, and converts the signal into an event format that can be transmitted to an application. Then, the screen input control unit 302 instructs the GUI parts control unit 303 to notify the input signal.

The GUI parts control unit 303 is a function for analyzing an event received from the screen input control unit 302. The CPU 111 determines the configuration of the GUI parts control unit 303 and sends a display instruction to the screen display control unit 301.

<Display on Display 120 of Image Processing Apparatus>

A home screen 401 to be displayed on the display 120 will be described with reference to FIG. 4. Unless otherwise noted, the home screen 401 according to the present exemplary embodiment is displayed by the screen display control unit 301.

The home screen 401 includes a main area 402 in which a plurality of software keys is displayed, and a timeline 404 on which a plurality of history buttons is displayed. The main area 402 is used to implement switching to another main area 402 by a flick operation in a lateral direction, and the timeline 404 enables switching of a history button that is not displayed in FIG. 4 into a display state by a flick operation in a longitudinal direction. However, a screen switching method in each area is not particularly limited. On the timeline 404, for example, a history button that is not displayed can be displayed by performing a lateral flick operation, or a display screen can be switched to another display screen by performing a lateral flick operation.

The flip operation and the drag operation can be detected as the user operation on each screen.

In the main area 402 on the home screen 401, a plurality of software keys for executing various functions of the image processing apparatus 101 is displayed.

A copy button 406, which is an example of software keys, is a software key for invoking a copy application. When a touch operation by a user operation is detected by the input control unit 115, the display control unit 116 causes the home screen 401 to shift to a copy setting screen (not illustrated).

A copy shared button 408 and a My transmission button 409 are software keys created by a user (e.g., a user 1) who has logged in to the image processing apparatus 101, or by an administrator. A person who has created a customized button determines whether to cause the customized button to be constantly displayed on the home screen 401. For example, the copy shared button 408 is a custom button created by the administrator of the image processing apparatus 101 and is constantly displayed on the home screen 401. When the copy shared button 408 is pressed, a document can be copied by 2-in-1 and double-sided printing. The My transmission button 409 is a custom button that is created by the user (user 1) which has logged in to the image processing apparatus 101. When the log-in user is switched to another user, the My transmission button 409 is not displayed. When the My transmission button 409 is pressed, document data can be transmitted in a portable document format (PDF) and with a resolution of 300 dpi.

Figure 4:
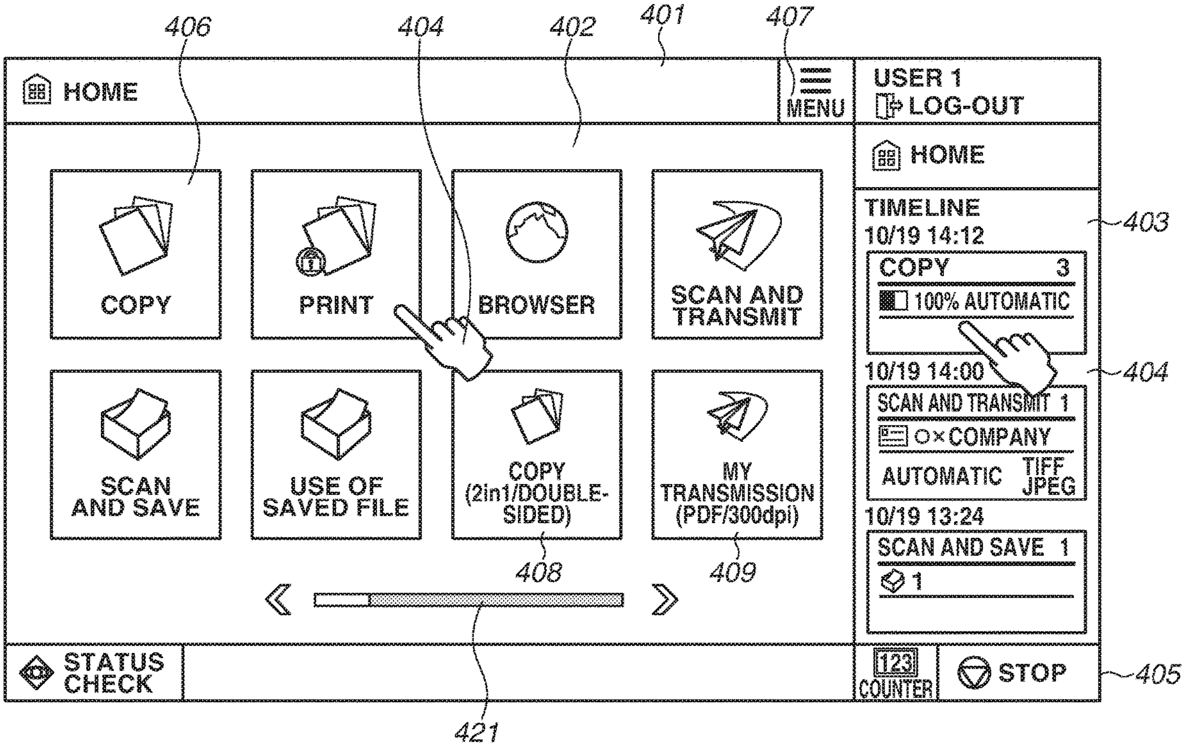
FIG. 4 illustrates an example of a home screen according to the exemplary embodiment of the present disclosure.

FIG. 4 illustrates that eight software keys are displayed. Software keys that cannot be displayed on the main area 402 are displayed on another main area 402 (not illustrated). The other main area 402 is switched and displayed using a lateral flick operation on the main area 402, or using a switching bar 421.

A setting menu 407 is a menu in which the background of the home screen 401, the size of each software key, or the number of software keys that can be displayed can be changed.

A right portion of the home screen 401 includes an upper software key area 403, the timeline 404, and a lower software key area 405. The upper software key area 403 and the lower software key area 405 are areas in which keys that can be constantly displayed and executed are arranged. In the upper software key area 403 according to the present exemplary embodiment, a home button for returning to the home screen 401 and a log-out button used for the user who has logged in to the image processing apparatus 101 to log out. In the lower software key area 405, a stop button for cancelling processing performed by an application and a counter indicating the number of sheets used for print processing are displayed.

The timeline 404 is an area for displaying a history button generated when processing corresponding to a software key displayed on the main area 402 is executed. In the history button displayed on the timeline 404, the same processing contents are not displayed in an overlapping manner. For example, history buttons indicating the same document data and the same print setting are not displayed on the timeline 404 in an overlapping manner Specifically, when processing that is not present on the timeline 404 is executed, the history button corresponding to the processing is added to the timeline 404 as a list for the first time. An order in which the history button is added is not particularly limited, and may be determined depending on the date and time when processing is executed.

Pressing a history button enables re-execution of processing based on the contents of the processing previously executed. In the present exemplary embodiment, a "copy" button, a "scan and transmit" button, a "scan and save" button are displayed as the history buttons corresponding to the processing previously executed. The number of history buttons that can be displayed on the timeline 404 is not particularly limited.

Figure 6A:
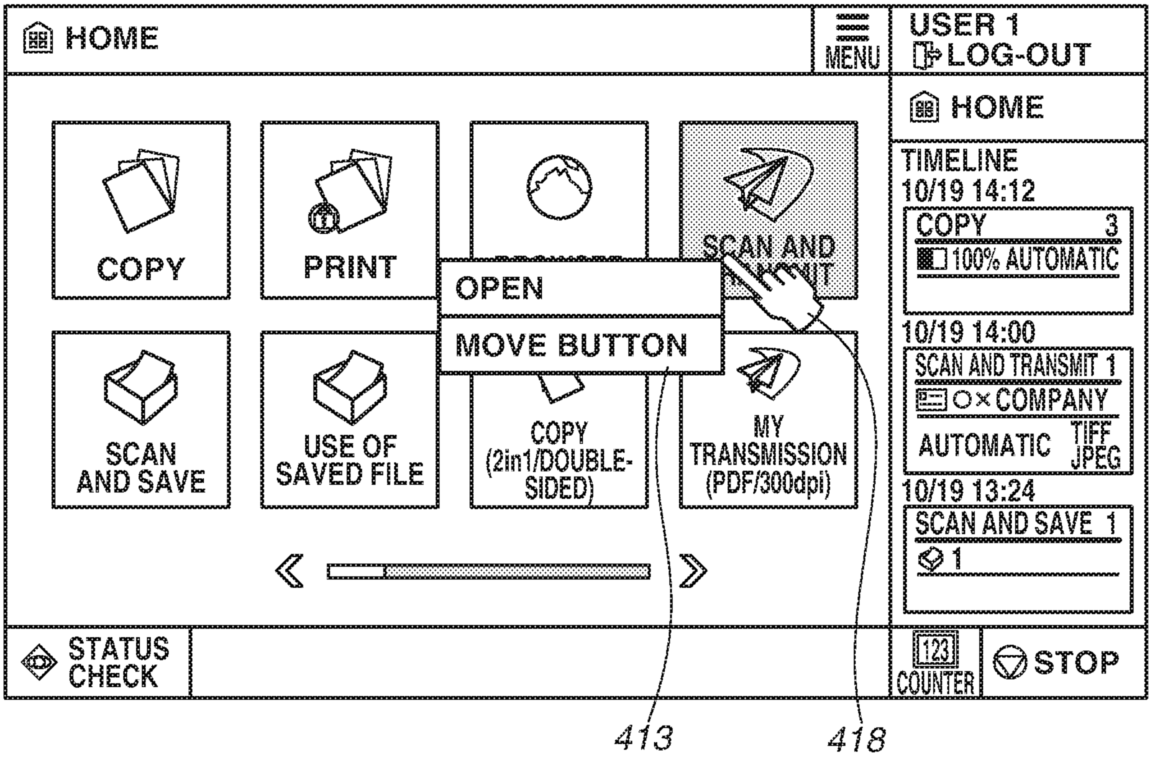
FIGS. 6A and 6B each illustrates an example of an operation state on a display of the image processing apparatus according to the exemplary embodiment of the present disclosure.

FIG. 6A illustrates a state where a hold-down operation 418 is executed on the software key "scan and transmit" displayed on the main area 402, and a context menu 413 is displayed. A positional relationship between the software key pressed to execute the hold-down operation 418 and the context menu 413 displayed as a result of pressing the software key is not limited to the configuration illustrated in FIG. 6A. For example, the context menu 413 may be displayed in a lower right direction or an upper direction of the software key.

Even when the user's finger used to execute the hold-down operation in a state where the context menu 413 is displayed is released, the display state of the context menu 413 is maintained. When a function on the context menu 413 that is being displayed is selected from the state, the processing corresponding to the function is executed. On the other hand, when the user's finger is released in the state where the context menu 413 is displayed and an area other than the context menu 413 in the home screen 401 is touched, the context menu 413 that is being displayed disappears.

One of the conditions for determining that the user operation corresponds to the hold-down operation 418 is a time for which the display 120 is pressed by the user operation. In the present exemplary embodiment, assume that the time is 500 msec. In a case where the display 120 is continuously pressed for 500 msec or longer, it is determined that the user operation corresponds to the hold-down operation.

Figure 7A:
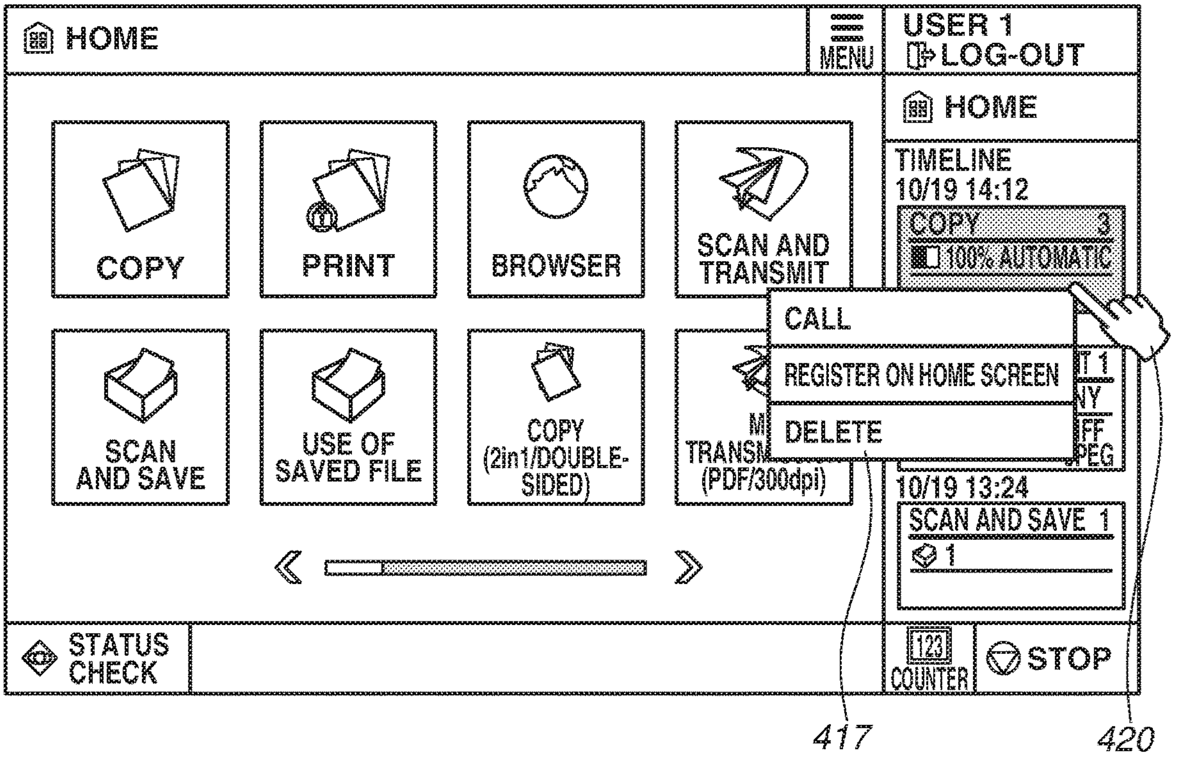
FIGS. 7A and 7B each illustrates an example of an operation state on the display of the image processing apparatus according to the exemplary embodiment of the present disclosure.

FIG. 7A illustrates a state where a hold-down operation 420 is executed on the history button "copy" on the timeline 404 and a context menu 417 is displayed. Also, in the history key, the position where the context menu 417 is displayed is not particularly limited, like in the case of software keys. Assume that the condition for the time based on which it is determined that the user operation corresponds to the hold-down operation 420 is 500 msec, like in the case of software keys.

Figure 6B:
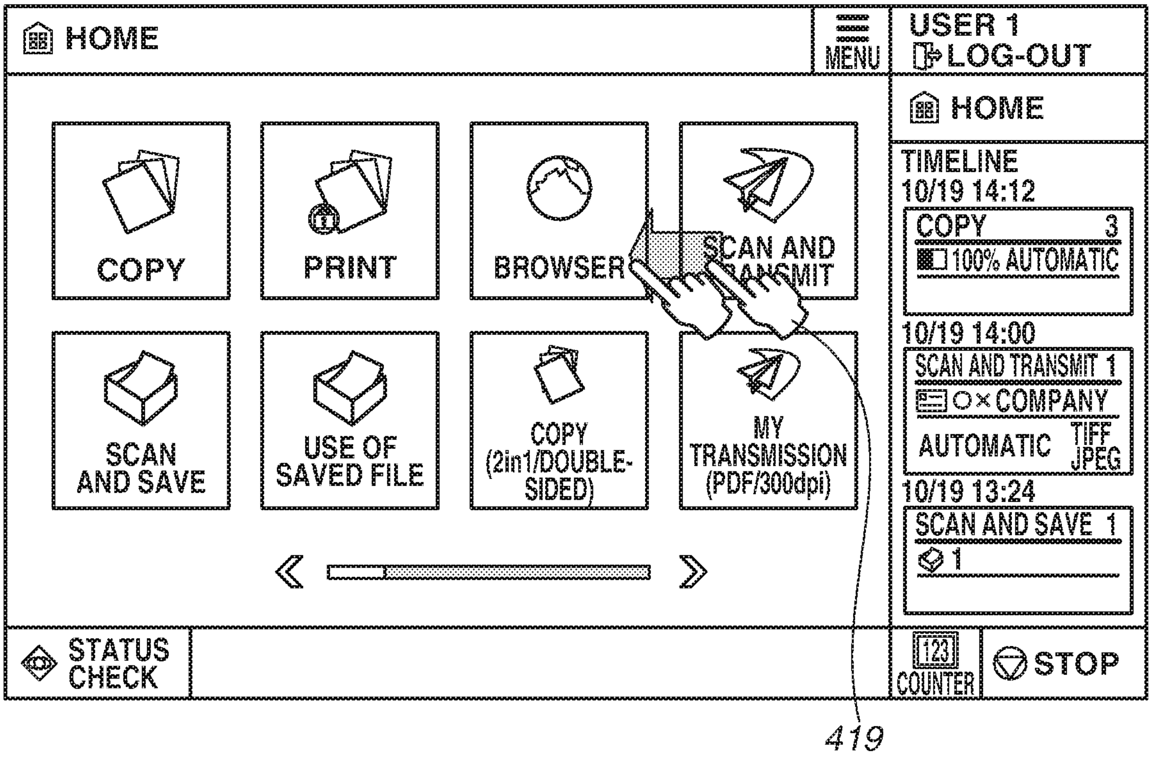

FIG. 6B illustrates a case where a lateral drag operation (lateral drag 419) is executed on the software key "scan and transmit". In this manner, in a case where the operation position is moved before the condition for determining that the user operation corresponds to the hold-down operation is satisfied, the context menu 413 is not displayed due to button execution cancellation processing. The button execution cancellation processing is processing for cancelling the execution of processing corresponding to a pressed software key when the movement distance from a position where the software key is touched to a position where the user's finger is released is greater than or equal to a predetermined number of pixels. The button execution cancellation processing may be used because this processing prevents execution of an erroneous operation on the software key due to an erroneous drag operation on the software key when the user executes the drag operation on the display 120 to switch the display to another main area 402.

Figure 7B:
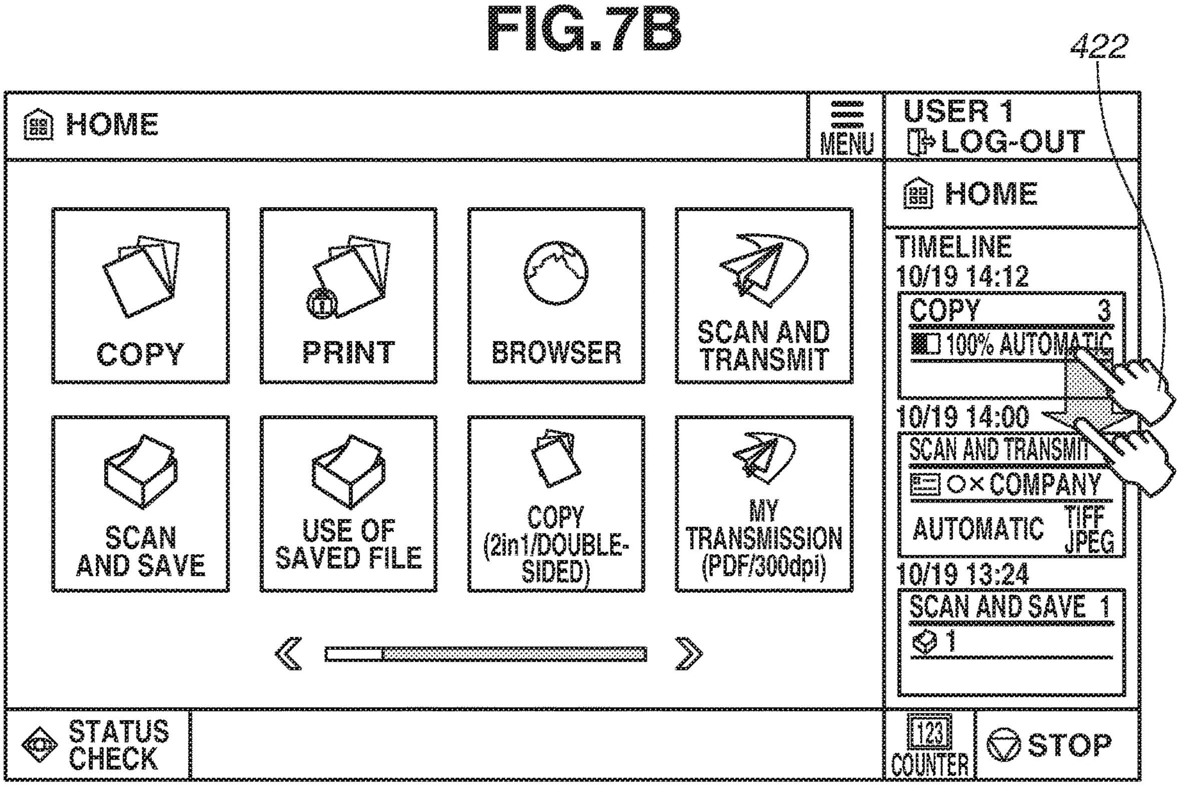

FIG. 7B illustrates a state where a drag operation (longitudinal drag 422) in the longitudinal direction is executed on the history button and the context menu 417 is not displayed due to list execution cancellation processing. The list execution cancellation processing is processing for cancelling the execution of processing corresponding to a pressed history button when the movement distance from a position where a software key is touched to a position where the user's finger is released is greater than or equal to a predetermined number of pixels. The list execution cancellation processing may be used because this processing prevents execution of an erroneous operation on the history key due to an erroneous drag operation on the history key when the user executes the drag operation on the display 120 to cause the display 120 to display the history button that has not been displayed.

Assume that a threshold for cancelling software key button execution processing is set to be greater than a threshold for cancelling history button list execution processing. For example, 35 pixels are set as the threshold for the former case, and 45 pixels are set as the threshold for the latter case. In the areas coexisting on the home screen 401, different thresholds are used depending on the operation direction of the user operation in each of the areas.

As illustrated in FIG. 8B, in a case where the touch display 124 is a pressure sensitive touch display, a coordinate variation corresponding to the area of a finger pad is detected. That is, since the finger pad is long in the longitudinal direction, a coordinate variation is more likely to occur in a longitudinal user operation than in a lateral user operation, and thus the threshold for the movement distance on the timeline 404 that involves the longitudinal user operation is set to be greater than that in the lateral user operation.

<Context Menu>

In each context menu, functions corresponding to held-down software keys are displayed as items. An "open" function and a "move button" function are displayed in the context menu 413. When the "open" function is selected, a screen (not illustrated) for executing the processing corresponding to the held-down software key is displayed on the display 120. That is, selecting the "open" function in the context menu 413 is synonymous to pressing the corresponding software key.

On the other hand, when the "move button" function in the context menu 413 is selected, all software keys displayed on the main area 402 are in a state of being movable by a user operation, and can be arranged at any location.

Figure 5:
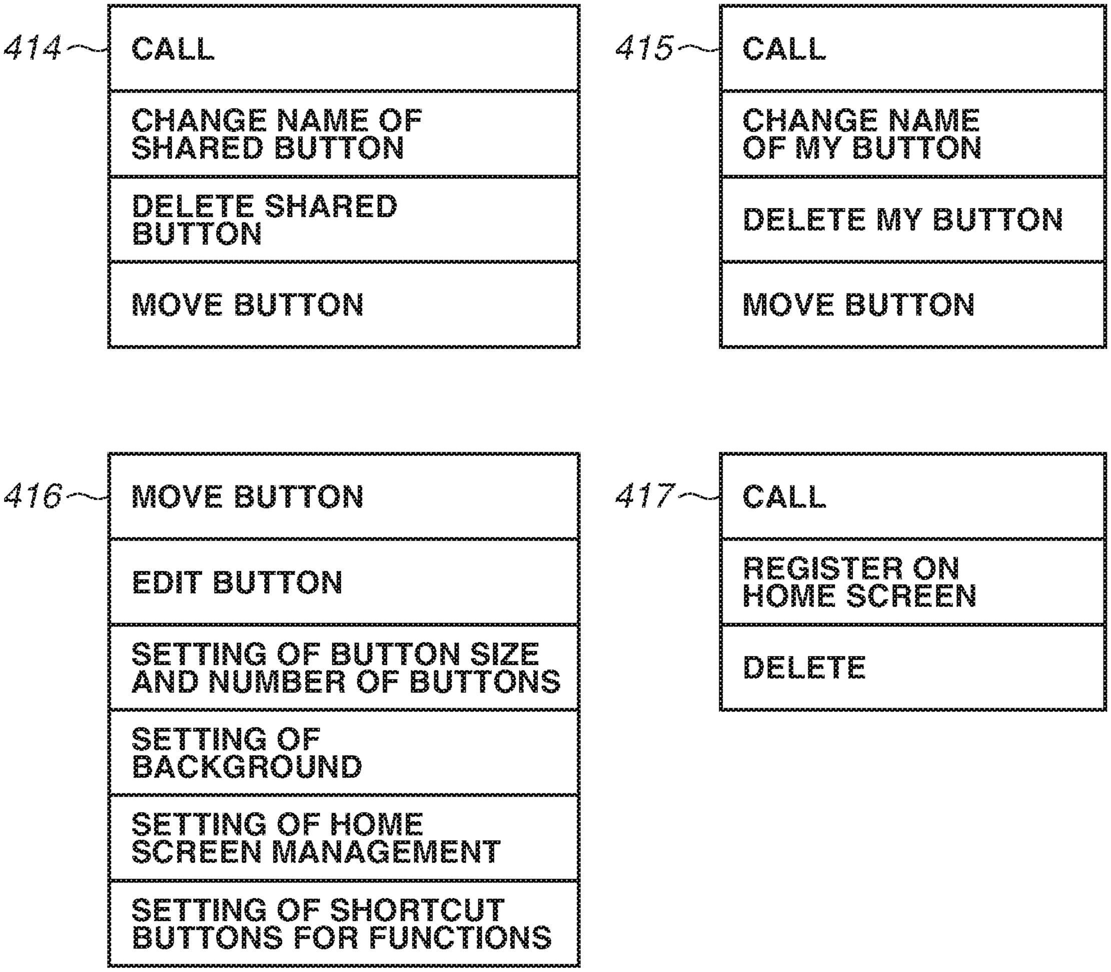
FIG. 5 illustrates examples of a context menu according to the exemplary embodiment of the present disclosure.

Other context menus will be described with reference to FIG. 5. The descriptions of the functions described above are omitted.

A context menu 414 is a context menu to be displayed when a shared button is held down. The shared button is a customized button created by the administrator and corresponds to the copy shared button 408 described above. The context menu 414 includes a "call" function for executing a software key, a "change name of shared button" function for changing the name of the shared button, a "delete shared button" function for deleting the shared button, and a "move button" function.

A context menu 415 is a context menu to be displayed when a My button is held down. The term "My button" refers to a customized button created by a log-in user. The My button corresponds to the My transmission button 409 described above. The context menu 415 includes the "call" function, a "change name of My button" for changing the name of the My button, a "delete My button" function for deleting the My button, and the "move button" function.

A context menu 416 is a context menu to be displayed when the setting menu 407 is pressed. The context menu 416 includes the "move button" function, an "edit button" function, a "setting of button size and number of buttons" function, a "setting of background" function, a "setting of home screen management" function, and a "setting of shortcut buttons for functions" function.

When the "setting of button size and number of buttons" function is selected, the size and the number of software keys displayed on the main area 402 can be changed. Although the eight software keys are displayed on the main area 402, for example, only six software keys may be displayed on the main area 402 by increasing the size of each button. In this case, the software keys that are not displayed may be displayed on another main area 402 that is displayed by switching the switching bar 421.

When the "setting of background" function is selected, the background of the main area 402 can be changed or set. When the "setting of home screen management" function is selected, various management settings on the home screen 401 can be executed. For example, display or non-display of the timeline 404 can be set. The "setting of shortcut buttons for functions" function enables creation of a software key for executing processing desired by the user as a shortcut button on the main area 402.

The context menu 417 is a context menu to be displayed when the history button is held down. The context menu 417 includes the "call" function, a "register on home screen" function, and a "delete" function. When the "register on home screen" function is selected, a button corresponding to processing corresponding to the held-down history button is displayed on the main area 402. The My transmission button 409 is an example of a software key created when a history button is held down. The history button displayed on the timeline 404 is associated with the user who has logged in to the image processing apparatus 101. Accordingly, the customized button created when the "edit button" function in the context menu is pressed is displayed only when the user who has created the customized button logs in to the image processing apparatus 101.

<Processing for Displaying Home Screen>

Figure 10:
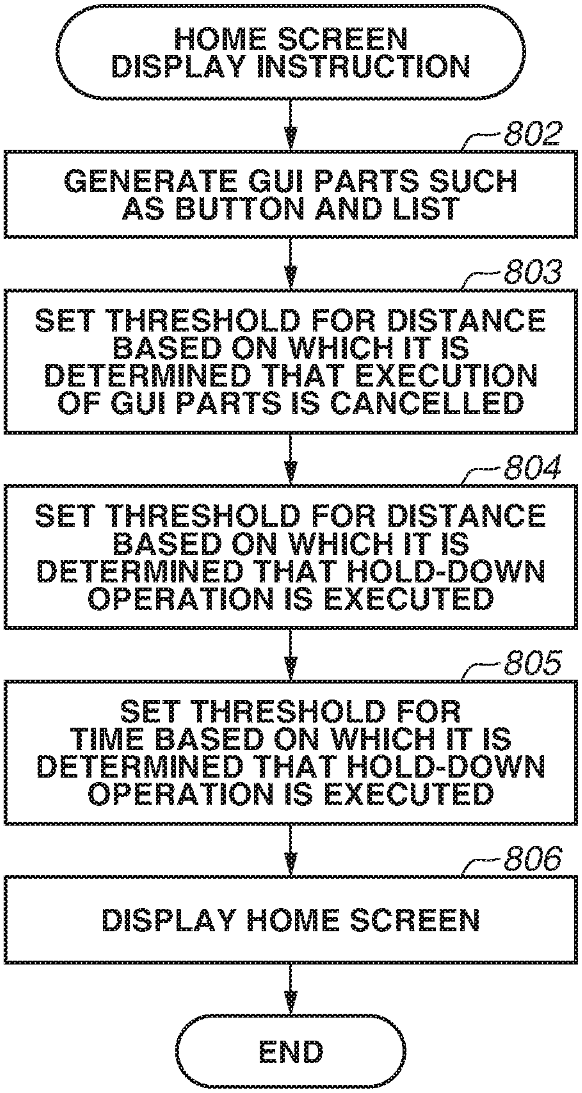
FIG. 10 is a flowchart illustrating processing for displaying the home screen according to the exemplary embodiment of the present disclosure.

FIG. 10 is a flowchart illustrating processing for displaying the home screen 401 in the image processing apparatus 101 according to the first exemplary embodiment. Each step illustrated in FIG. 10 is processing to be performed in such a manner that the CPU 111 executes a program preliminarily stored in the ROM 113 or the external memory 121. The processing illustrated in FIG. 10 is executed when the image processing apparatus 101 is activated.

In step S802, the CPU 111 generates GUI parts such as a software key or a history button.

In step S803, the CPU 111 sets a threshold for a distance based on which it is determined the execution of GUI parts is cancelled. In the present exemplary embodiment, 10 pixels are set as a threshold for determining that pressing of a software key is cancelled (button execution cancellation processing), and five pixels are set as a threshold for determining that pressing of a history button is cancelled (list execution cancellation processing).

In step S804, the CPU 111 sets a threshold for a distance based on which it is determined that the hold-down operation on various buttons is executed. In the present exemplary embodiment, 35 pixels are set as the threshold for the software key distance, and 45 pixels are set as the threshold for the history button distance.

The threshold set in step S803 is different from the threshold set in step S804. This is because the user operation expected in step S803 is different from the user operation expected in step S804. A conceivable user operation in step S803 is, for example, the tap operation. Specifically, this operation can be an operation for displaying a setting screen by tapping a software key or a history button and executing processing corresponding to the software key or the history button. On the other hand, a conceivable user operation in step S804 is the hold-down operation.

Since a time for which a user's finger is in contact with the touch display 124 in the hold-down operation is longer than that in the tap operation, a variation at a touch position is more likely to occur in the hold-down operation. Further, in the tap operation, the user tends to perform the operation by causing a user's fingertip to softly touch the touch display 124, and thus the contact area is small. On the other hand, in the hold-down operation, the user causes the entire finger pad to contact the touch display 124, and thus the contact area is large. Accordingly, the threshold for cancellation set in step S803 is set to be smaller than the threshold set in step S804.

In step S805, the CPU 111 sets a threshold for a time based on which it is determined that the hold-down operation is executed. In the present exemplary embodiment, assume that the threshold for the time based on which it is determined that the hold-down operation is executed on various buttons is 500 msec. In step S806, the CPU 111 displays the home screen.

The processing for displaying the home screen 401 is as described above. The order in which steps S803 to 805 are executed is not particularly limited, as long as various thresholds are set by the CPU 111.

<Detection of User Operation on Pressure Sensitive Touch Display>

Processing for detecting a user operation on a pressure sensitive touch display will be described with reference to FIG. 11.

Figure 9A:
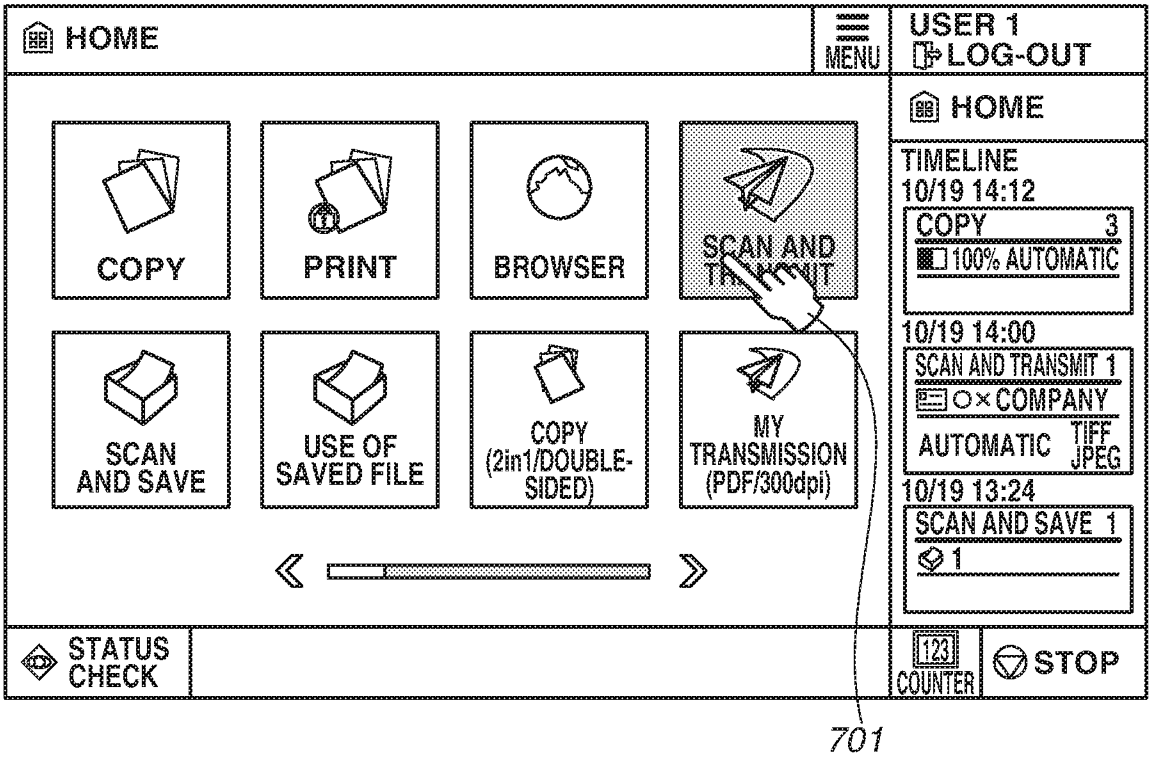
FIGS. 9A, 9B, and 9C each illustrates an example of an operation state on the display of the image processing apparatus according to the exemplary embodiment of the present disclosure.

In step S808, the CPU 111 detects a touch of a finger on a software key. In the present exemplary embodiment, a user operation for causing a user's finger pad to contact the pressure sensitive touch display is referred to as a touch, and the software key "scan and transmit" is touched. FIG. 9A illustrates a state where a hold-down operation 701 is executed on the software key "scan and transmit" on the home screen 401. A software key on which the hold-down operation is executed is highlighted by, for example, changing the color of the software key so as to distinguish the software key from the other software keys. The highlighted state of the software key illustrated in FIG. 9A is maintained until it is determined that the hold-down operation detected in step S808 corresponds to a cancel operation.

In step S809, the CPU 111 sets a timer for notifying a hold-down event, and starts counting the time from the detection of the user operation on the touch display 124.

In step S810, the CPU 111 determines whether a move operation is detected. The move operation is detected based on whether a touch position is shifted from an initial touch position by the user operation. The determination made in step S810 corresponds to branch processing for determining whether the user operation corresponds to the hold-down operation or the tap operation. In step S810, if the move operation is detected (YES in step S810), the processing proceeds to step S811. If the move operation is not detected (NO in step S810), the processing proceeds to step S819.

Figure 9B:
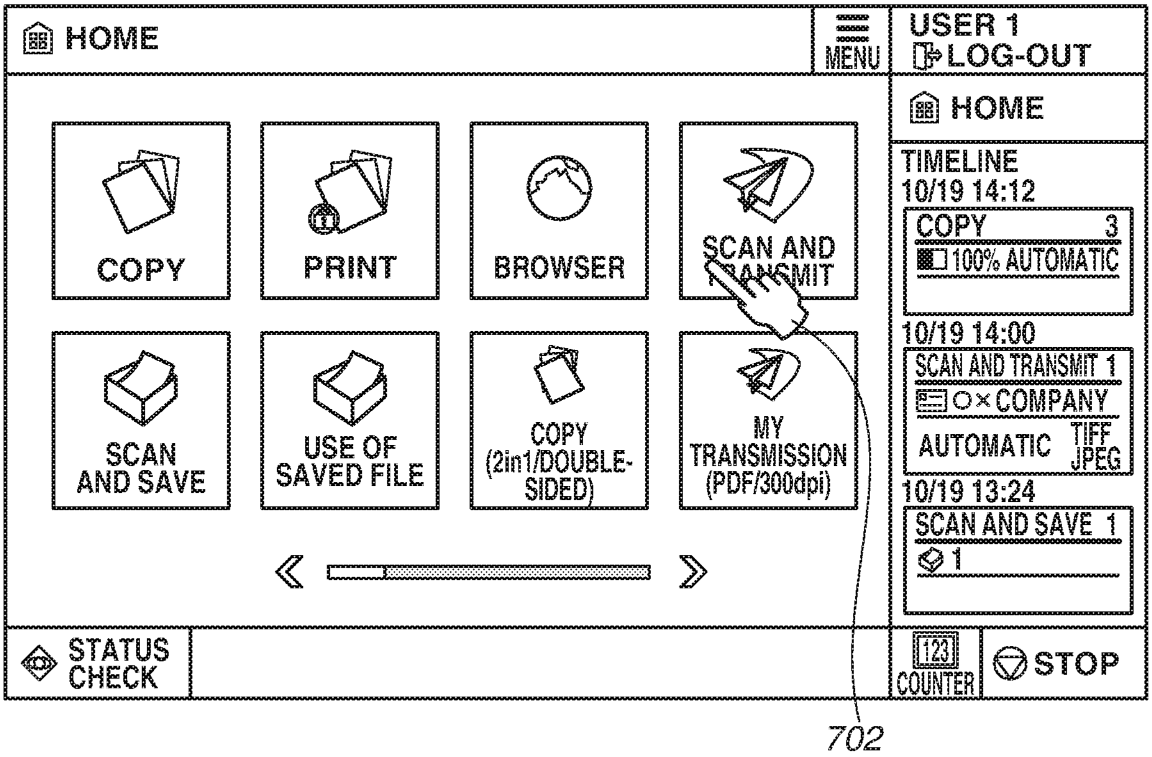

In step S811, the CPU 111 determines whether an execution cancel threshold is exceeded. If it is determined that the execution cancel threshold is exceeded (YES in step S811), the processing proceeds to step S812. In this case, the software key highlighted in step S808 is not highlighted any more. FIG. 9B illustrates a state where the execution of the hold-down operation 701 on a software key is cancelled due to the occurrence of a coordinate variation in the hold-down operation on the touch display 124. Assuming that a threshold for a distance based on which it is determined that the execution cancellation processing is executed is, for example, 10 pixels, a coordinate variation of 10 pixels or more has occurred against the user's intention during the execution of the hold-down operation (701 to 702).

In step S811, if it is determined that the execution cancel threshold is not exceeded (NO in step S811), the processing proceeds to step S813.

In a case where the execution cancel threshold is exceeded, in step S812, the CPU 111 sets an execution cancel flag. The execution cancel flag indicates an ON/OFF switch in a program. When the execution cancel flag is set to the ON switch (TRUE), the execution cancel flag indicates that the execution of the processing is cancelled. The execution cancel flag set before step S812 is executed indicates FALSE. However, in a case where it is determined that the user's hold-down operation exceeds the execution cancel threshold in step S811, the execution cancel flag is switched to TRUE.

In step S813, the CPU 111 determines whether the hold-down event has already been notified in step S812. If it is determined that the hold-down event has already been notified (YES in step S813), the processing proceeds to step S819. If it is determined that the hold-down event has not been notified (NO in step S813), the processing proceeds to step S814.

In step S813, when the hold-down event is notified once, the result of the second and subsequent determinations in step S813 indicates "YES". Then, the processing shifts to step S819 without carrying out the processing of step S815, and the timer set in step S809 is not cancelled. In other words, the hold-down event is not notified again and the context menu is not repeatedly displayed until the release operation is detected in step S819.

In step S814, the CPU 111 determines whether the threshold for the distance based on which it is determined that the hold-down operation is executed is exceeded. If the threshold for the distance based on which it is determined that the hold-down operation is executed is exceeded (YES in step S814), the processing proceeds to step S815. If the threshold for the distance based on which it is determined that the hold-down operation is executed is not exceeded (NO in step S814), the processing proceeds to step S816.

If it is determined that the threshold for the distance based on which it is determined that the hold-down operation is executed is executed in step S814, it is determined that the user operation does not correspond to the hold-down operation. Accordingly, the CPU 111 executes the cancellation of the timer for notifying the hold-down operation, and in step S815, the CPU 111 resets counting by the timer.

In step S814, if it is determined that the threshold for the distance based on which it is determined that the hold-down operation is executed is not exceeded (NO in step S814), the processing proceeds to step S816. In step S816, the CPU 111 determines whether the threshold for the time based on which it is determined that the hold-down operation is executed is exceeded. In this case, the timer set in step S809 is referenced. If it is determined that the threshold for the time is exceeded (YES in step S816), the processing proceeds to step S817. If it is determined that the threshold for the time is not exceeded (NO in step S816), the processing proceeds to step S819.

Figure 9C:
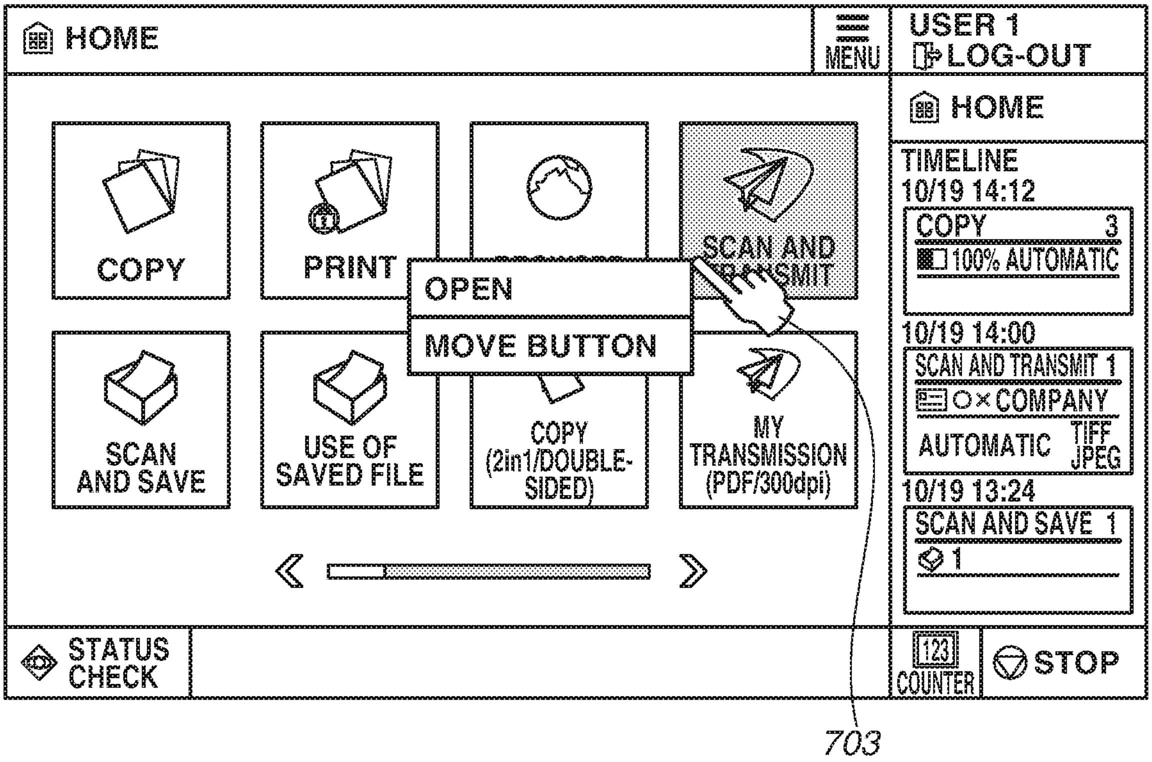

In step S816, if the threshold for the time based on which it is determined that the hold-down operation is executed is exceeded (YES in step S816), the processing proceeds to step S817. In step S817, the CPU 111 notifies the hold-down event. In step S818, the CPU 111 displays a context menu. FIG. 9C illustrates a state of the home screen 401 in this case. Simultaneously with the display of the context menu, the software key that has not been highlighted is highlighted again.

In step S819, the CPU 111 determines whether a release operation is detected. If the release operation is detected (YES in step S819), the processing proceeds to step S820. If the release operation is not detected (NO in step S819), the processing returns to step S810.

In step S820, the CPU 111 determines whether the execution cancel flag indicates TRUE. If the execution cancel flag is set to TRUE by the processing in step S812 (YES in step S820), this processing is terminated without executing the processing corresponding to the software key touched in step S808. If the execution cancel flag does not indicate TRUE (NO in step S820), the processing proceeds to step S821.

In step S821, the CPU 111 executes the processing corresponding to the software key touched in step S808.

As a result of pressing the pressure sensitive touch display 124 by the processing described above, the determination as to whether the user operation corresponds to the hold-down operation is executed even when the execution of the processing corresponding to the user operation is cancelled. Consequently, it is possible to display a context menu even when a coordinate variation occurs.

Figure 11:
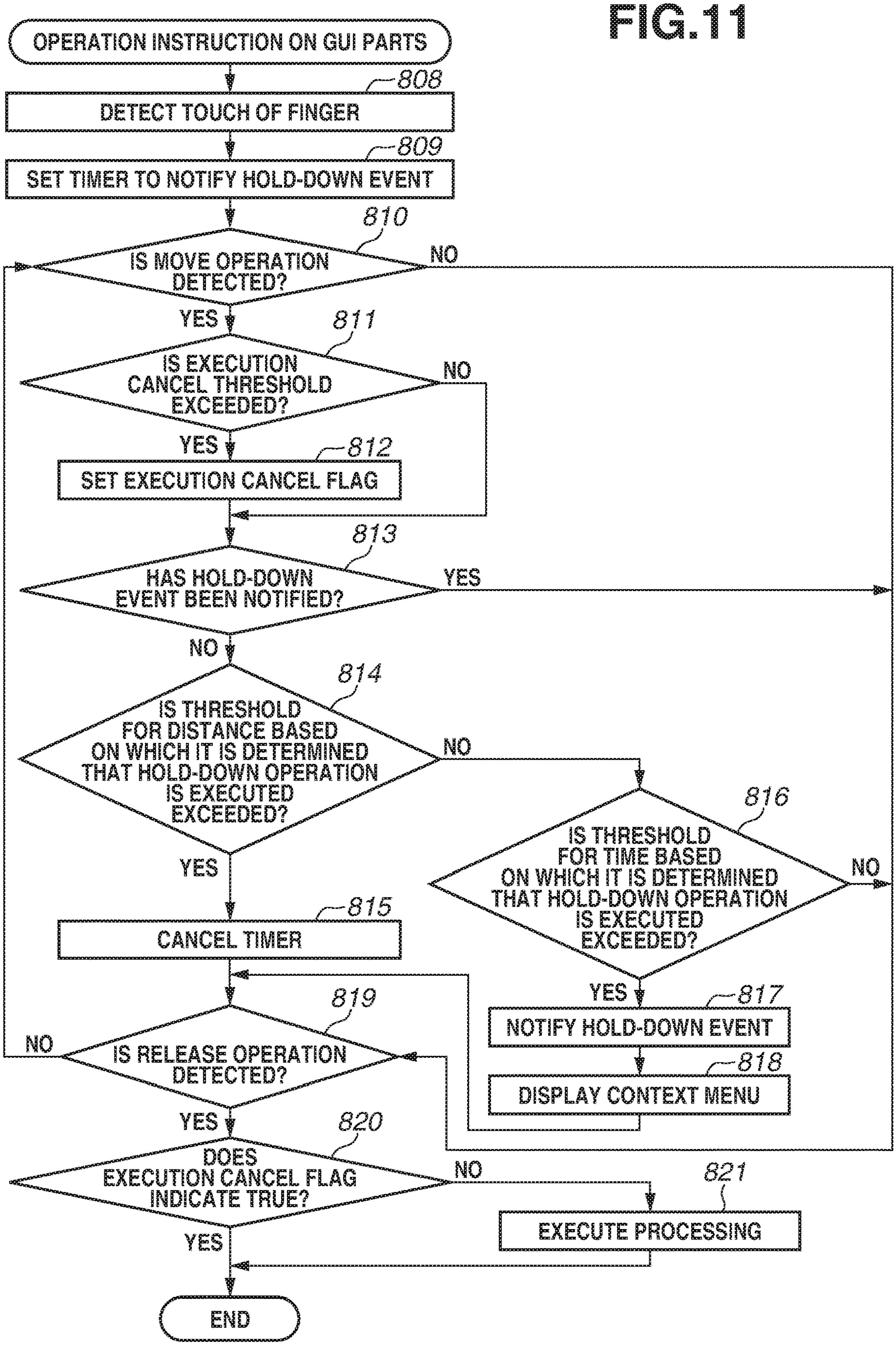
FIG. 11 is a flowchart illustrating processing for determining a user operation according to the exemplary embodiment of the present disclosure.

The processing illustrated in FIG. 11 is executed also when the user operation on a software key does not correspond to the hold-down operation and corresponds to the tap operation. If the tap operation is not detected as the move operation, the processing shifts from step S810 to step S819. After the tap operation is completed and the release operation is detected in step S819, the processing of steps S820 and S821 is executed and the processing corresponding to the software key on which the tap operation has been executed is executed.

A second exemplary embodiment will be described below. The first exemplary embodiment illustrates an example in which the touch display 124 is a pressure sensitive touch display, while the second exemplary embodiment illustrates a method for setting a threshold for determining the hold-down operation in consideration of a case where the touch display 124 is an electrostatic touch panel.

Figure 12:
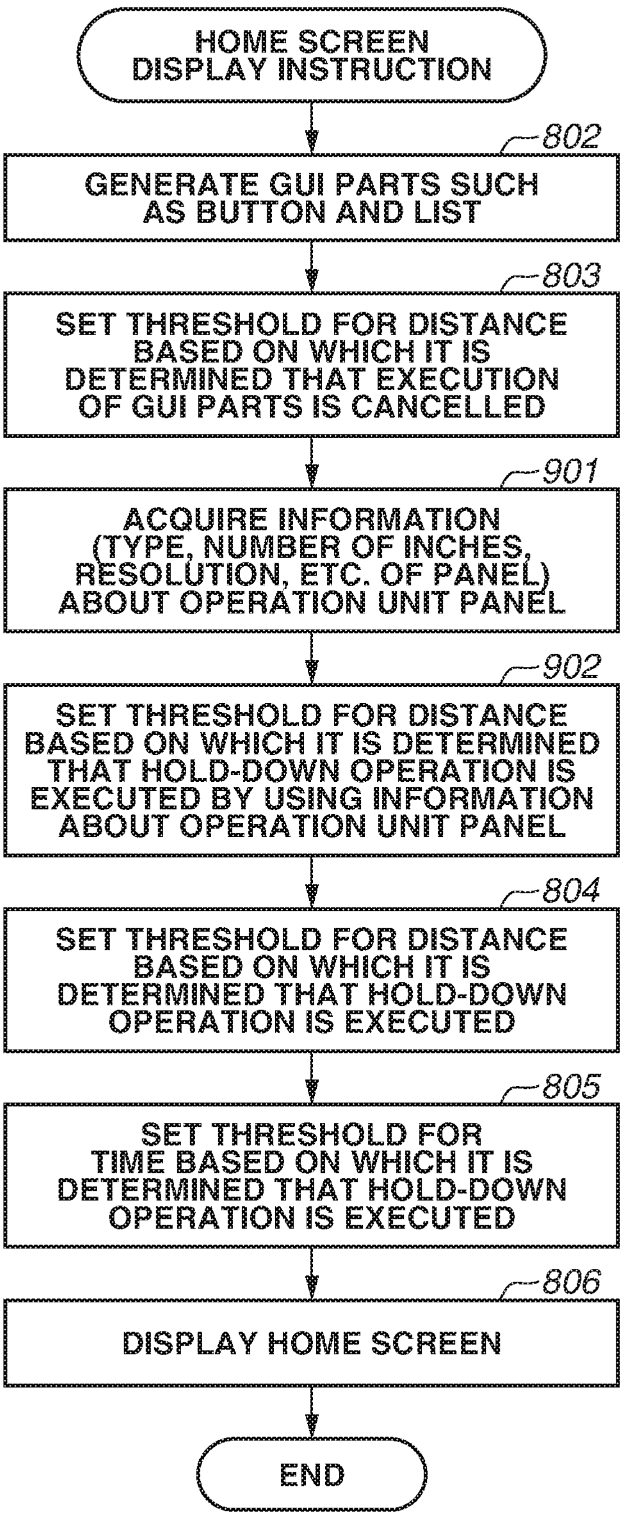
FIG. 12 is a flowchart illustrating processing for displaying the home screen according to the exemplary embodiment of the present disclosure.

FIG. 12 is a flowchart to be executed by the image processing apparatus 101 when a multi-touch operation is performed. Each step illustrated in FIG. 12 is processed in such a manner that the CPU 111 executes a program stored in the ROM 113 or the external memory 121. The parts described above are denoted by the same reference numerals, and descriptions thereof are omitted.

After the distance threshold for cancelling the execution of the software key is set in step S803, the CPU 111 acquires information about an operation unit panel (step S901). Examples of the information about the operation unit panel include the type of the touch display, such as a pressure sensitive touch display, an electrostatic touch display, or a touch display other than the pressure sensitive touch display and the electrostatic touch display, the number of inches, and a resolution.

In step S902, the CPU 111 sets a threshold for a distance based on which it is determined that the hold-down operation is executed by using the information about the operation unit panel. A coordinate variation that occurs in the electrostatic touch display 124 is smaller than that in the pressure sensitive touch display 124. Accordingly, the threshold for the electrostatic touch display 124 is set to be smaller than that for the pressure sensitive touch display 124. Specifically, the threshold for the pressure sensitive touch display 124 (threshold for the distance based on which it is determined that the hold-down operation is executed on the main area 402) can be set to 35 pixels, while the threshold for the electrostatic touch display 124 can be set to, for example, “15 pixels”, which is smaller than the threshold for the pressure sensitive touch display 124.

The processing for setting different thresholds depending on the type of the touch display has been described above. The above-described processing makes it possible to display a context menu, regardless of a coordinate variation, even when an electrostatic touch display or a pressure sensitive touch display is used as the touch display 124.

OTHER EMBODIMENTS

FIG. 11 illustrates a configuration in which the timer for notifying the hold-down event is not cancelled until the release operation is detected in step S819. However, the present disclosure is not limited to this configuration. A configuration for executing cancellation of the timer after a context menu is displayed without the need for detecting the release operation can also be employed. In this configuration, for example, when the drag operation is performed to move the touch position to the software key “My transmission” from the state where a hold-down operation 703 illustrated in FIG. 9C is executed, the context menu 413 can be switched to the context menu 415 corresponding to the software key “My transmission”.

The first exemplary embodiment illustrates an example of the configuration in which one location on the pressure sensitive touch display 124 is touched. In contrast, in a case where a plurality of locations on the touch display 124 is touched, the processing flow illustrated in FIG. 8 is executed on the touch operation that is first detected. In other words, even when a plurality of locations on the touch display 124 is touched and an operation other than the touch operation that is first detected is detected as the touch operation, all the operations are ignored (not output as an event).

In the first exemplary embodiment, the determination using the time threshold is executed after the determination using the distance threshold is executed, and it is determined whether the user operation corresponds to the hold-down operation. However, the order in which the determinations using the thresholds are executed is not particularly limited. Specifically, a configuration in which the determination as to whether the user operation corresponds to the hold-down operation is made based on the time in step S814 and then the determination as to whether the hold-down operation is executed is made based on the movement distance in step S816 may be employed.

In the first and second exemplary embodiments, the present disclosure has been described in detail above based on the preferred exemplary embodiments. However, the present disclosure is not limited to the specific exemplary embodiments, and various configurations within the scope of the disclosure are also included in the present disclosure. Some of the exemplary embodiments described above may be combined as needed.

Further, the image processing apparatus 101 described above includes various apparatuses. Examples of the image processing apparatus 101 include not only a PC, a personal digital assistant (PDA), and a mobile phone unit, but also a printer, a scanner, a FAX, a copying machine, an MFP, a camera, a video camera, and other image viewers. Embodiment(s) of the present disclosure can also be realized by a computerized configuration(s) of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-132479, filed Jul. 12, 2018, which is hereby incorporated by reference herein in its entirety.

What is claimed is:

1. An image processing apparatus that includes a plurality of applications for using functions of the image processing apparatus, a software key for activating one of the plurality of applications being arranged on a touch panel display, the image processing apparatus comprising:

- a detection unit configured to detect a user operation based on a pressure of an instruction part on the touch panel display to determine a contact area in which the instruction part is in contact with the touch panel display to be a movement distance of the instruction;
- a display unit configured to display a context menu for displaying a function corresponding to the software key on the touch panel display;
- a first determination unit configured to determine whether the contact area of the instruction part exceeds a threshold for cancelling a touch operation; and
- a second determination unit configured to determine whether a touch operation with the instruction part satisfies at least a condition relating to a distance among a plurality of conditions for determining that the touch operation is a hold-down operation,
- wherein, in a case where, after the first determination unit determines that the contact area exceeds the threshold, the second determination unit determines whether the touch operation satisfies the condition relating to the distance, and then the second determination unit determines that the touch operation satisfies the condition relating to the distance, the display unit displays the context menu.

2. The image processing apparatus according to claim 1, wherein the touch panel display includes a first area for displaying the software key, and a second area in which a history button for re-using a setting content of the application preliminarily used, and

- wherein the display unit displays a context menu for displaying a function corresponding to the history button on the touch panel display.

3. The image processing apparatus according to claim 1, wherein the second determination unit further determines whether the touch operation with the instruction part satisfies a condition relating to time among the plurality of conditions for determining that the touch operation is the hold-down operation.

4. The image processing apparatus according to claim 1, wherein in a case where the first determination unit determines that the processing corresponding to the user operation is to be cancelled, the image processing apparatus sets a flag indicating cancellation of the processing corresponding to the user operation on the software key.

5. The image processing apparatus according to claim 1, wherein the first determination unit and the second determination unit each continue to perform determination process by when the detection unit detects that the instruction part has been released from the touch panel display.

6. A control method for an image processing apparatus that includes a plurality of applications for using functions of the image processing apparatus, a software key for activating one of the plurality of applications being arranged on a touch panel display, the control method comprising:

- detecting a user operation based on a pressure of an instruction part on the touch panel display to determine a contact area in which the instruction part is in contact with the touch panel display to be a movement distance of the instruction;
- displaying a context menu for displaying a function corresponding to the software key on the touch panel display;
- executing a first determination to determine whether the contact area of the instruction part exceeds a threshold for cancelling a touch operation; and
- executing a second determination to determine whether a touch operation with the instruction part satisfies at least a condition relating to a distance among a plurality of conditions for determining that the touch operation is a hold-down operation,
- wherein, in a case where, after the first determination determines that the contact area exceeds the threshold, the second determination determines whether the touch operation satisfies the condition relating to the distance, and then the second determination determines that the touch operation satisfies the condition relating to the distance, the display unit displays the context menu.

7. A non-transitory storage medium storing instructions to function as an image processing unit that includes a plurality of applications for using functions of the image processing apparatus, a software key for activating one of the plurality of applications being arranged on a touch panel display, the non-transitory storage medium storing the instructions that when executed by one or more processors controls the one or more processors to operate as:

- a detection unit configured to detect a user operation based on a pressure of an instruction part on the touch panel display to determine a contact area in which the instruction part is in contact with the touch panel display to be a movement distance of the instruction;
- a display unit configured to display a context menu for displaying a function corresponding to the software key on the touch panel display;

a first determination unit configured to determine whether the contact area of the instruction part exceeds a threshold for cancelling a touch operation; and a second determination unit configured to determine whether a touch operation with the instruction part satisfies at least a condition relating to a distance among a plurality of conditions for determining that the touch operation is a hold-down operation, wherein, in a case where, after the first determination unit determines that the contact area exceeds the threshold, the second determination unit determines whether the touch operation satisfies the condition relating to the distance, and then the second determination unit determines that the touch operation satisfies the condition relating to the distance, the display unit displays the context menu.

* * * * *